(12) United States Patent
De Kruif (10) Patent No.: US 8,467,604 B2
(45) Date of Patent: Jun. 18, 2013

(54) COLOR ENHANCEMENT (75) Inventor: Petrus W. G. M. De Kruif, Goirle (NL)

(73) Assignee: Entropic Communications, Inc., San Diego, CA (US)

( * ) Notice: Subject to any disclaimer, the term of this patent is extended or adjusted under 35 U.S.C. 154(b) by 437 days.

(21) Appl. No.: 12/676,358

(22) PCT Filed: Sep. 2, 2008

(86) PCT No.: PCT/IB2008/053545
§ 371 (c)(1),
(2), (4) Date: May 28, 2010

(87) PCT Pub. No.: WO2009/031098
PCT Pub. Date: Mar. 12, 2009

(65) Prior Publication Data
US 2010/0246950 A1    Sep. 30, 2010

(30) Foreign Application Priority Data

Sep. 3, 2007 (EP) .................................. 07115565

(51) Int. Cl.
*G06K 9/00* (2006.01)
(52) U.S. Cl.
USPC .......................................... 382/167; 382/162
(58) Field of Classification Search
None
See application file for complete search history.

(56) References Cited

U.S. PATENT DOCUMENTS

| | | | | |
|---|---|---|---|---|
| 6,229,580 B1 * | 5/2001 | Inoue | ............................. | 348/649 |
| 2004/0239814 A1 * | 12/2004 | Hirashima et al. | ............ | 348/649 |
| 2004/0240729 A1 * | 12/2004 | Cooper et al. | ................ | 382/162 |
| 2006/0203297 A1 * | 9/2006 | Kuwata et al. | ................ | 358/448 |
| 2007/0070369 A1 * | 3/2007 | Wang | ............................. | 358/1.9 |

FOREIGN PATENT DOCUMENTS

EP    1 482 743 A2    12/2004

OTHER PUBLICATIONS

PCT/IB08/053545 International Search Report and Written Opinion dated Apr. 22, 2010.
International Search Report for PCT/IB2008/053545 mailed Dec. 16, 2008.
Written Opinion of the International Searching Authority for PCT/IB2008/053545 mailed Dec. 16, 2008.

* cited by examiner

*Primary Examiner* — Li Liu
(74) *Attorney, Agent, or Firm* — Bruce Greenhaus; Richard Bachand; Duane Morris LLP (57) ABSTRACT

In an image processor, a color format converter (CFC) converts a pixel ($P_{i,j}$), which is expressed in an RGB color space, into a converted pixel ($PC_{i,j}$), which is expressed in an YUV color space. A color shift vector generator (CSO, SVC) generates a color shift vector ($SV_{i,j}$), which is expressed in the YUV color space, on the basis of the converted pixel ($PC_{i,j}$). An inverse color format converter (ICFC) converts the color shift vector ($SV_{i,j}$) into a color enhancement vector ($EV_{i,j}$), which is expressed in the RGB color space. An adder (ADD) adds the color enhancement vector ($EV_{i,j}$) to the pixel ($P_{i,j}$) so as to obtain a color enhanced pixel ($PE_{i,j}$).

10 Claims, 5 Drawing Sheets

COLOR ENHANCEMENT

FIELD OF THE INVENTION

An aspect of the invention relates to an image processor capable of enhancing colors in an image. The image processor may be implemented as, for example, an integrated circuit. Other aspects of the invention relate to a method of color enhancement, a video system, and a computer program product for a programmable processor.

BACKGROUND ART

An image can be made more appealing by purposely modifying colors in the image. This technique will be referred to as color enhancement hereinafter. For example, relatively pale skin colors, which may faithfully represent a human face, can be shifted towards a preferred skin color by means of image processing. This type of image processing is generally referred to as skin tone shift. As another example, an image, which may faithfully represent green vegetation, can be made more appealing by enhancing saturation of green colors. This type of image processing is generally referred to a green enhance. Another type of color enhancement is a so-called blue stretch, which can make an image with blue sky and white objects, such as clouds, look more appealing.

Color enhancement is preferably carried out in a so-called YUV color space. The YUV color space is a three-dimensional space with a luminance axis "Y", a first chrominance axis "U", and a second chrominance axis "V". A pixel, which has a given color, represents a point in the YUV color space. The pixel can also be regarded as a vector that extends from the origin of the YUV color space to the aforementioned point. The pixel has a luminance component, which corresponds with a position on the luminance axis "Y", a first chrominance component, which corresponds with a position on the first chrominance axis "U", and a second chrominance component, which corresponds with a position on the second chrominance axis "V". The given color of the pixel can be modified by modifying at least one chrominance component. That is, the given color of the pixel can be modified by modifying the respective positions on one of the chrominance axes, or on both axes.

There are relatively many applications, in which an image is available in a so-called RGB format. That is, the image is expressed in an RGB color space, which has a red axis, a green axis, and a blue axis. A pixel of such an image has a red component, a green component, and a blue component. The pixel constitutes a point in the RGB color space whose location is defined by the aforementioned components. The pixel can also be regarded as a vector that extends from the origin of the RGB color space to the aforementioned point.

An image, which is expressed in the RGB color space, may be converted into the YUV color space for the purpose of color enhancement. An YUV image, which is obtained by the aforementioned conversion, is processed in accordance with a type of color enhancement that is desired, such as, for example, skin tone shift. Accordingly, an color-enhanced image is obtained, which is expressed in the YUV color space. An inverse conversion, from the YUV color space to the RGB color space, is necessary in order to obtain a color-enhanced image in the RGB format. U.S. Pat. No. 5,384,601 uses such an approach.

SUMMARY OF THE INVENTION

It is an object of the invention to provide a color enhancement technique that can be implemented at relatively moderate cost. The independent claims define various aspects of the invention. The dependent claims define additional features for implementing the invention to advantage.

The invention takes the following points into consideration. A conversion from the RGB color space to the YUV color space typically introduces a loss of resolution. The same applies to an inverse conversion, from the YUV color space to the RGB color space. For example, let it be assumed that an effective resolution of 8 bits is required. In order to achieve such a resolution, the conversion from the RGB color space to the YUV color space and the inverse conversion may need to be carried out with a 10-bit precision. What is more, processing operations in the YUV color space for the purpose of color enhancement, may equally need to be carried out with a 10-bit precision. Consequently, the prior art approach requires relatively expensive circuitry in order to guarantee a given image quality.

In accordance with the invention, a color format converter converts a pixel, which is expressed in an RGB color space, into a converted pixel, which is expressed in an YUV color space. A color shift vector generator generates a color shift vector, which is expressed in the YUV color space, on the basis of the converted pixel. An inverse color format converter converts the color shift vector into a color enhancement vector, which is expressed in the RGB color space. An adder adds the color enhancement vector to the pixel so as to obtain a color enhanced pixel.

Accordingly, a loss of resolution, which color format conversions may introduce, only affects the color enhancement vector, which is added to the pixel concerned. The pixel concerned constitutes a vector in the RGB color space, which typically has a substantially greater magnitude than the color enhancement vector. In case the color enhancement vector has a relatively modest precision, this will affect the resolution of the color enhanced pixel to a relatively small extent only. Consequently, the color format converter and the inverse color format converter, as well as the color shift vector generator, need not have a relatively high precision in order to guarantee that the resolution of the color enhanced pixel is at a given level. The aforementioned entities may therefore be implemented with relatively simple circuitry. For those reasons, the invention allows color enhancement implementations at relatively modest cost.

An implementation of the invention advantageously comprises one or more of following additional features, which are described in individual paragraphs that correspond with individual dependent claims.

The color shift vector generator is preferably arranged to generate the color shift vector on the basis of a color enhancement definition, which comprises a definition of at least one type of color enhancement.

Respective color zones in the YUV color space are preferably associated with respective types of color enhancement. The color shift vector generator may then detect if the converted pixel falls within a color zone. If so, the color shift vector is generated in accordance with the type of color enhancement associated with that color zone.

The color enhancement definition preferably defines an order of priority for different types of color enhancement. The color shift vector generator may then apply the type of color enhancement that has the highest priority among those respective types of color enhancement that are associated with respective color zones in which the converted pixel falls.

A color zone may advantageously have a trapezium shape.

An image analyzer preferably analyzes at least one image that the image processor receives so as to establish the color enhancement definition depending on colors that are predominant in the at least one image.

A histogram builder may establish a color histogram on the basis of the at least one image. The color histogram indicates colors that are predominant in the at least one image. A histogram analyzer may then establish the color enhancement definition on the basis of the color histogram.

A controller may apply control parameters to the image analyzer on the basis of which the image analyzer establishes the color enhancement definition as a function of the colors that are predominant in the at least one image.

The color shift vector generator may comprise a color shift operator and a color shift vector composer. The color shift vector operator provides a gross color shift vector and a weighing coefficient for a converted pixel that falls within a color zone in the YUV color space. The weighting coefficient depends on a relative position of the converted pixel within the color zone in accordance with a weighting profile. The color shift vector composer composes the color shift vector on the basis of the gross color shift vector and the weighting coefficient.

A detailed description with reference to drawings illustrates the invention summarized hereinbefore, as well as the additional features.

DETAILED DESCRIPTION

Figure 1:
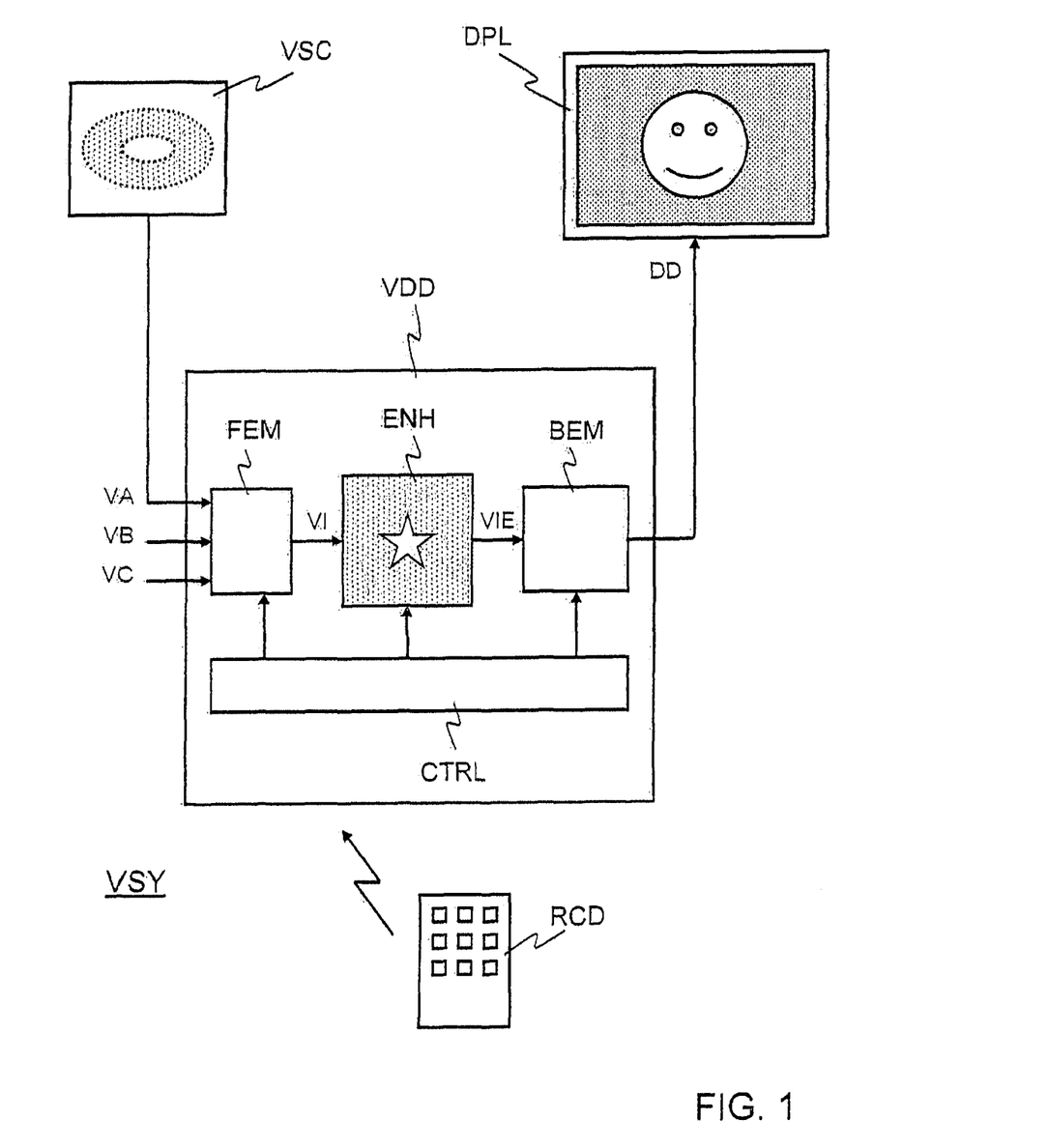
FIG. 1 is a block diagram that illustrates a video system.

FIG. 1 illustrates a video system VSY. The video system VSY comprises a video source VSC, a video display driver VDD, a display device DPL, and a remote control device RCD. In more detail, the video display driver VDD comprises a front-end module FEM, a color enhancer ENH, a backend module BEM, and a controller CTRL. The video source VSC may be, for example, a video reproduction apparatus, a video broadcast receiver, or a communication network interface for downloading a video from server. The display device DPL may be, for example, a flat panel display of the liquid crystal type. The color enhancer ENH may be implemented in the form of an integrated circuit, which may further comprise one or more functional entities that belong to the front-end module FEM or the backend module BEM, or both.

The video display driver VDD basically operates as follows. The front-end module FEM receives an external video signal VA from the video source VSC. The front-end module FEM may receive other external video signals from other video sources, such as, for example, external video signals VB and VC illustrated in FIG. 1. A user may select one of the video signals VA, VB, VC by means of his or her remote control device RCD. The external video signal that the user has selected will be referred to as the selected video signal hereinafter.

The front-end module FEM provides an internal video signal VI, which corresponds with the selected video signal. The internal video signal VI may be a pre-processed version of the selected video signal. To that end, the front-end module FEM may carry out one or more video processing operations, such as, for example, input formatting, color space transformation, and de-interlacing.

The color enhancer ENH purposely changes particular colors, which the internal video signal VI represents, so as to enhance perceptual image quality. For example, the color enhancer ENH may carry out a so-called skin tone shift in order to give human skin a more appealing look. As another example, the color enhancer ENH may carry out a so-called green enhance in order to give plants and trees a more appealing look. As yet another example, the color enhancer ENH may carry out a so-called blue stretch in order to give sky, as well as other scenes in which blue and white occur, a more appealing look. The color enhancer ENH provides an enhanced internal video signal VIE, which comprises such enhanced colors.

The backend module BEM illustrated in FIG. 1 processes the enhanced internal video signal VIE so as to obtain a display driver signal DD for the display device DPL. To that end, the backend module BEM may carry out various signal processing operations, such as, for example, amplification, level shifting, bias voltage generation, and synchronization. One or more video processing operations may precede the aforementioned signal processing operations. For example, the backend module BEM may carry out a scaling operation or a sharpness enhancement operation, or other operations that affect the manner in which the display device DPL displays the selected external video signal.

Figure 2:
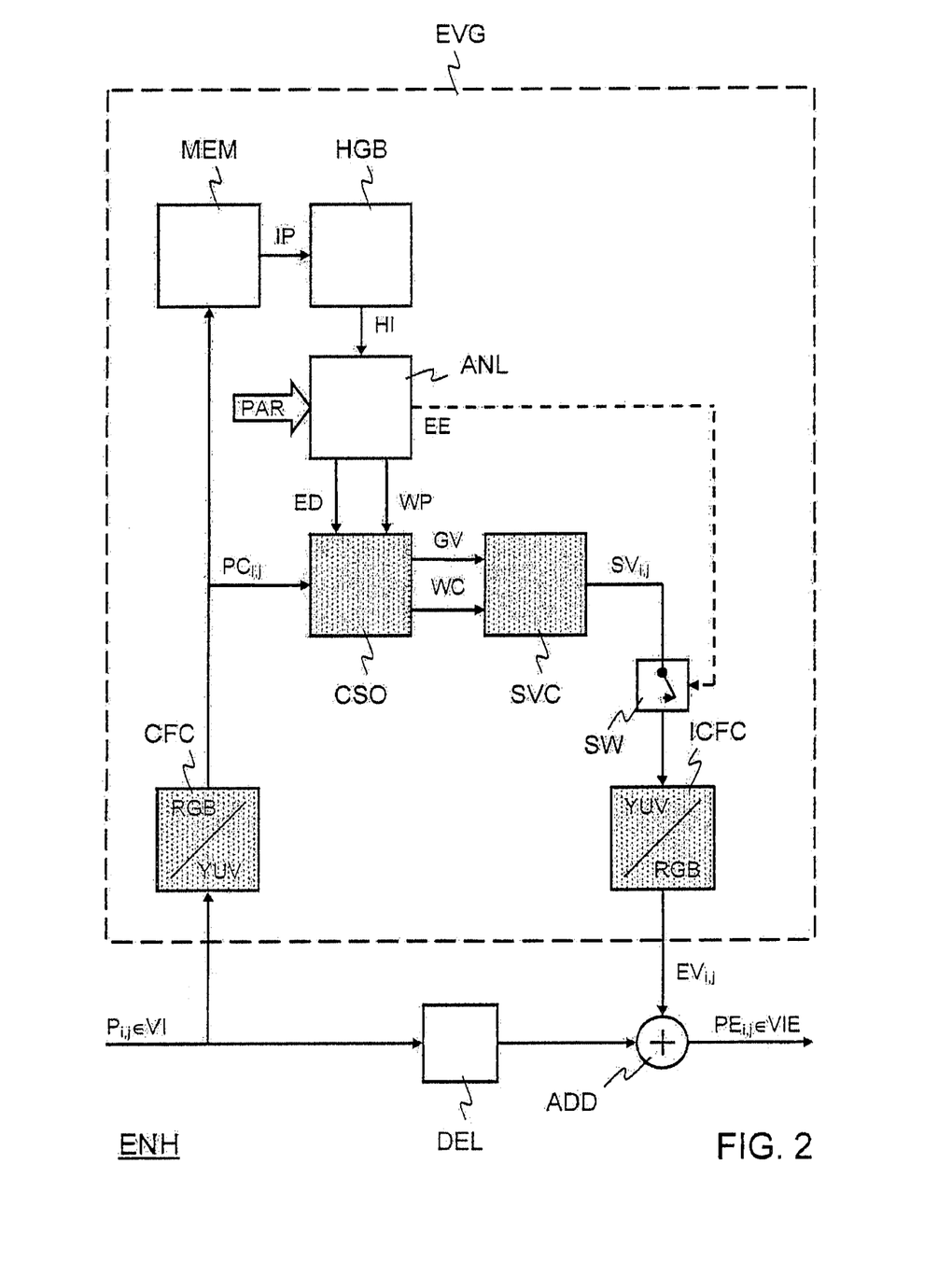
FIG. 2 is a functional diagram that illustrates a color enhancer, which forms part of the video system.

FIG. 2 illustrates the color enhancer ENH. The color enhancer ENH comprises two main functional entities: enhancement vector generator EVG and an adder ADD. A delay DEL is functionally arranged in parallel with the enhancement vector generator EVG. The enhancement vector generator EVG comprises various functional entities: a color format converter CFC, a color shift operator CSO, a color shift vector composer SVC, and an inverse color format converter ICFC. The color enhancer ENH further comprises an image memory MEM, a histogram builder HGB, and a histogram analyzer ANL. A switch SW is arranged between the inverse color format converter ICFC and the adder ADD.

The color enhancer ENH receives a stream of pixels, which are comprised in the internal video signal VI. A pixel $P_{i,j}$ belongs to a given image and has a certain position within that image. The position may be expressed in terms of a set of coordinates: a horizontal coordinate "i", which corresponds with a line position, and a vertical coordinate "j", which corresponds with a line number. The position of a pixel $P_{i,j}$ an image typically corresponds with a position of the pixel $P_{i,j}$ in the stream of pixels on a given time axis, which may be defined by means of a reference clock signal.

The internal video signal VI has an RGB format. That is, a pixel $P_{i,j}$ comprises three components: a red component, a green component, and a blue component. A pixel $P_{i,j}$ can be regarded as a particular point in a three-dimensional color space, which has a red axis, a green axis, and a blue axis. Each pixel component, red, green, and blue, has a particular value, which determines the location of the aforementioned particular point in this three-dimensional color space, which will be referred to as RGB color space hereinafter. Each component value may be expressed by means of, for example, 8 bits. A pixel $P_{i,j}$ in the internal video signal VI may also be regarded as a vector in the RGB color space, which extends from the origin in the RGB color space to the particular point mentioned hereinbefore.

The color enhancer ENH basically operates as follows. The enhancement vector generator EVG generates an enhancement vector $EV_{i,j}$ for a pixel $P_{i,j}$, which is comprised in the internal video signal VI. The enhancement vector $EV_{i,j}$ is expressed in the RGB color space and may therefore be added to the pixel $P_{i,j}$ concerned. The adder ADD provides a vectorial sum of the pixel $P_{i,j}$ concerned and the enhancement vector $EV_{i,j}$, which has been established for that pixel $P_{i,j}$. The vectorial sum constitutes a color-enhanced pixel $PE_{i,j}$ for the enhanced internal video signal VIE. It should be noted that the color enhancer ENH need not generate an enhancement vector $EV_{i,j}$ for each pixel $P_{i,j}$ in image. It may even occur that the color enhancer ENH does not generate any enhancement vector $EV_{i,j}$ for any pixel $P_{i,j}$ in a particular image. These cases, which correspond with the switch SW being in an open state, will be explained in greater detail hereinafter.

The enhancement vector generator EVG operates as follows. The color format converter CFC provides a converted pixel $PC_{i,j}$ in response to a pixel $P_{i,j}$ in the internal video signal VI. The converted pixel $PC_{i,j}$ comprises three components: a luminance component Y, a first chrominance component U, and a second chrominance component V. The converted pixel $PC_{i,j}$ may be regarded as a particular point in an YUV color space, which is three-dimensional. The converted pixel $PC_{i,j}$ may also be regarded as a vector in the YUV color space, which extends from the origin in the YUV color space to the particular point mentioned hereinbefore. That is, the color format converter CFC converts a vector in the RGB color space, which represents a pixel $P_{i,j}$, into a vector in the YUV color space, which represents the same pixel $P_{i,j}$. Briefly stated, the color format converter CFC carries out a conversion from the RGB color space to the YUV color space.

The color shift operator CSO establishes a gross color shift vector $GV_{i,j}$ for a converted pixel $PC_{i,j}$ on the basis of a color enhancement definition ED. The color enhancement definition ED defines one or more types of color enhancement that should be applied to the image of interest. In case various types of color enhancement should be applied to the image, the color enhancement definition ED may further define an order of priority for these types of color enhancement. A particular color zone within the YUV color space is associated with each type of color enhancement.

Figure 3A:
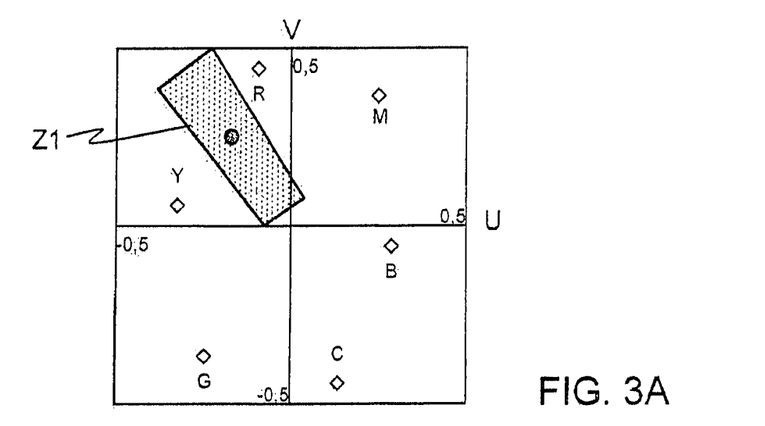
FIGS. 3A-3C are color diagrams that illustrate various color zones for various types of color enhancement.
Figure 3B:
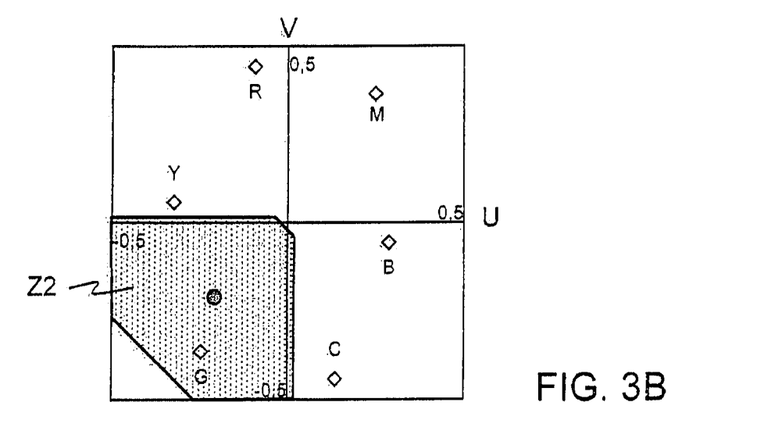
Figure 3C:
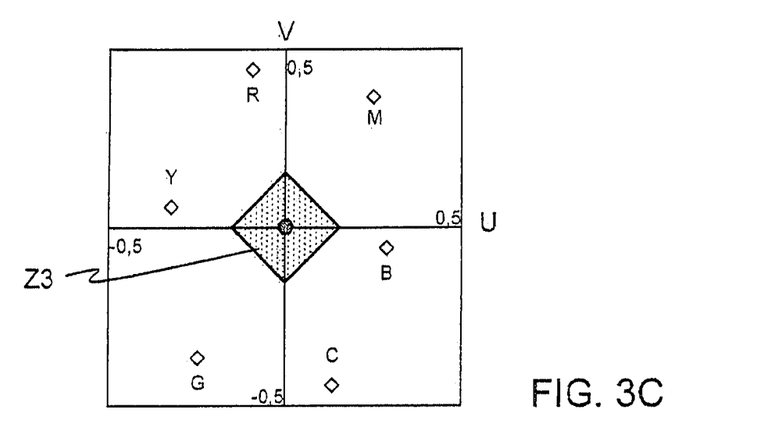

FIGS. 3A-3C illustrate different color zones Z1, Z2, Z3 for different types of color enhancement. Each Figure comprises a color diagram, which has a U axis that is horizontal and a V axis that is vertical. These axes correspond with two chrominance axes in the YUV color space, the other axis in the YUV color space being a luminance axis. A particular point in the color diagram corresponds with a particular color. FIGS. 3A-3C indicate various colors by means of lozenges, each of which is associated with a particular capital letter. The capital letter R indicates a red, M indicates magenta, B indicates blue, C indicates cyan, G indicates green, Y indicates yellow.

More specifically, FIG. 3A illustrates a color zone Z1 for a skin tone shift. FIG. 3B illustrates a color zone Z2 for a green enhance. FIG. 3C illustrates a color zone Z3 for a blue stretch. In each Figure, a relatively small grayish circle indicates a center of gravity of the detection zone concerned. The converted pixel $PC_{i,j}$ corresponds with a particular point in the color diagram of each Figure. The converted pixel $PC_{i,j}$ has a given location with respect to the center of gravity, which will be referred to as relative location hereinafter.

The color shift operator CSO detects whether the converted pixel $PC_{i,j}$ falls within any of the one or more color zones that are associated with the one or more types of color enhancement that the color enhancement definition ED defines. In case the converted pixel $PC_{i,j}$ falls within such a color zone, the color shift operator CSO establishes the gross color shift vector $GV_{i,j}$ in accordance with the type of color enhancement that is associated with the color zone concerned. In case the converted pixel $PC_{i,j}$ is outside each of the color zones that apply, the color shift operator CSO provides a "zero" vector. That is, the color shift operator CSO establishes the gross color shift vector $GV_{i,j}$ only if the converted pixel $PC_{i,j}$ is within a color zone of interest. The color shift operator CSO does not consider color zones that are associated with types of color enhancement that are not included in the color enhancement definition ED.

In case there is an overlap between two different color zones, it may occur that the converted pixel $PC_{i,j}$ falls within these two different color zones. The order of priority in the color enhancement definition ED will specify different priorities for the two different types of color enhancement that are associated with these two different color zones. One of the two types of color enhancement has a higher priority than the other one. The color shift operator CSO applies the type of color enhancement that has the higher priority. A similar reasoning applies in case there is an overlap between more than two different color zones. The order of priority in the color enhancement definition ED will determine the type of color enhancement in case a choice has to be made.

The gross color shift vector $GV_{i,j}$ depends on the type of color enhancement that should be applied. For example, the color enhancement definition ED may define the following elements for a type of color enhancement: a desired rotation of the vector in the YUV color space that corresponds with the converted pixel $PC_{i,j}$ or a desired change of magnitude of this vector, or a combination of these. A rotation of the vector concerned produces a tone shift, which is suitable for enhancing skin colors, for example. An increase of magnitude produces an increase of saturation, which is suitable for enhancing green colors of vegetation, for example. In any case, the gross color shift vector $GV_{i,j}$ is established so that a vectorial sum of this vector and the converted pixel $PC_{i,j}$ produces a grossly enhanced pixel that exhibits a particular rotation, or a particular change of magnitude, with respect to the converted pixel $PC_{i,j}$ whichever applies. Stated simply, the gross color shift vector $GV_{i,j}$ pushes the converted pixel $PC_{i,j}$ in a desired direction, as it were.

The color shift operator CSO may provide the gross color shift vector $GV_{i,j}$ in the following manner. The color shift operator CSO may effectively divide the color zone concerned into various subzones. A fixed, predefined gross color shift vector may be associated with each different subzone by means of, for example, a table. Let it be assumed that the converted pixel $PC_{i,j}$ falls within a particular subzone. The color shift operator CSO detects this and, in response, provides the fixed, predefined gross color shift vector that is associated with the subzone concerned, as the gross color shift vector $GV_{i,j}$. In a more advanced implementation, the color shift operator CSO may adapt the fixed, predefined gross color shift vector as a function of a relative location of the converted pixel $PC_{i,j}$ within the subzone concerned. The relative location may be defined with respect to a midpoint in the subzone concerned or with respect to one or more borders of the subzone concerned, or both.

For example, the color zone Z1 illustrated in FIG. 3A may be divided into two equal halves, a left half and a right half, by an imaginary line that crosses the origin. A gross color shift vector may be associated with each half. The gross color shift vector that is associated to the left half may point to the right half. Conversely, the gross color shift vector that is associated to the right half may point to the left half. Accordingly, the gross color shift vector $GV_{i,j}$ that the color shift operator CSO provides in this manner, can be regarded as pushing the converted pixel $PC_{i,j}$ towards the aforementioned imaginary line.

The color shift operator CSO further establishes a weighing coefficient $W_{i,j}$ in association with the gross color shift vector $GV_{i,j}$. The weighing coefficient $W_{i,j}$ varies as a function of the relative location of the converted pixel $PC_{i,j}$ in accordance with a weighing profile WP. That is, the weighing profile WP specifies respective weighing coefficient $W_{i,j}$ for respective relative locations, which the converted pixel $PC_{i,j}$ may have. The histogram analyzer ANL defines the weighing profile WP that applies for a given image. This will be explained in greater detail hereinafter.

Figure 4:
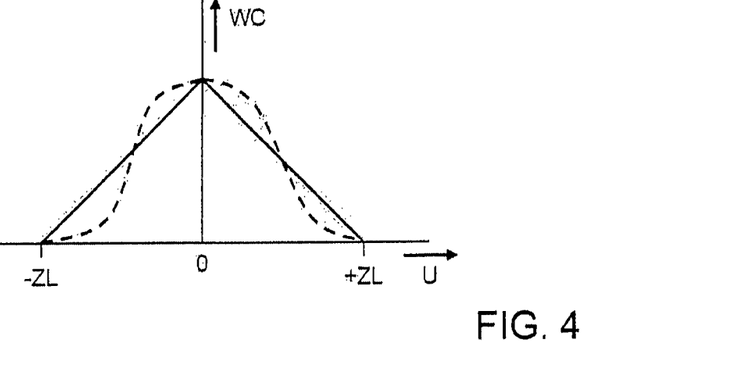
FIG. 4 is a graph that illustrates different weighting profiles, which can be applied for the purpose of color enhancement.

FIG. 4 illustrates two different weighting profiles in a simplified manner by means of a one-dimensional representation. FIG. 4 is a graph that has a horizontal axis and a vertical axis. The horizontal axis represents a distance between a point in the color diagram of FIGS. 3A-3C and the center of gravity of the color zone concerned along a given axis in the color diagram. The origin of the graph corresponds with the center of gravity. A negative zone limit −ZL and a positive zone limit +ZL on the horizontal axis correspond with two respective border points of the color zone. A vertical axis represents the weighing coefficient $W_{i,j}$.

FIG. 4 illustrates a linear weighing profile by means of full lines. The weighing coefficient $W_{i,j}$ has a maximum value at the center of gravity of the color zone and decreases proportionally with the distance from the center of gravity. The weighing coefficient $W_{i,j}$ is equal to zero when the distance corresponds with the positive zone limit +ZL or the negative zone limit −ZL and for any distance beyond these limits, which implies a point that is outside the color zone concerned. The linear weighing profile corresponds with a triangle in the one-dimensional representation of FIG. 4. In a two-dimensional representation, the linear weighing profile would constitute a pyramid shape.

FIG. 4 also illustrates a nonlinear weighing profile by means of broken lines. This nonlinear weighing profile has a shape of a bell. In accordance with this nonlinear weighing profile, the weighing coefficient $W_{i,j}$ varies to relatively small extent as a function of the distance relatively close to the center of gravity and relatively close to the negative zone limit −ZL and the positive zone limit +ZL. The weighing coefficient $W_{i,j}$ varies to relatively large extent in an intermediate region, which is substantially half way between the center of gravity and the negative zone limit −ZL, and a corresponding intermediate region, which is substantially half way between the center of gravity and the positive zone limit +ZL.

The color shift vector composer SVC composes a color shift vector $SV_{i,j}$ on the basis of the gross color shift vector $GV_{i,j}$ and the weighing coefficient $W_{i,j}$, which the color shift operator CSO provides. The color shift vector $SV_{i,j}$ is a scaled version of the gross color shift vector $GV_{i,j}$. That is, the color shift vector composer SVC scales the gross color shift vector $GV_{i,j}$ in accordance with the weighing coefficient $W_{i,j}$. The color shift vector $SV_{i,j}$ is expressed in the YUV color space.

The inverse color format converter ICFC converts the color shift vector $SV_{i,j}$ from the YUV color space into the RGB color space. This converted color shift vector constitutes the aforementioned enhancement vector $EV_{i,j}$, which the adder ADD adds to the pixel $P_{i,j}$ for which the color shift vector $SV_{i,j}$ was established. The adder ADD receives this pixel $P_{i,j}$ via the delay DEL, which accounts for a given time that is needed for establishing the enhancement vector $EV_{i,j}$.

The image memory MEM in the enhancement vector generator EVG temporarily stores converted pixels. Accordingly, the image memory MEM comprises at least one preceding image in an YUV format.

The histogram builder HGB establishes a color histogram HI for at least one preceding image the stored in the image memory MEM. To that end, the histogram builder HGB effectively divides the color diagram illustrated in FIGS. 3A-3C into various segments. A segment represents a collection of similar colors. The histogram builder HGB keeps a pixel count for each segment. The histogram builder HGB effectively carries out a pixel-by-pixel scan of at least one preceding image. Initially, each pixel count is equal to zero. The pixel count of a segment is incremented by one unit if a pixel in falls within that segment. The color histogram HI is obtained at the end of the pixel-by-pixel scan. Each segment has a final pixel count, which constitutes the color histogram HI. The color histogram HI indicates a range of colors that is predominant in the one or more preceding image is concerned.

Figure 5A:
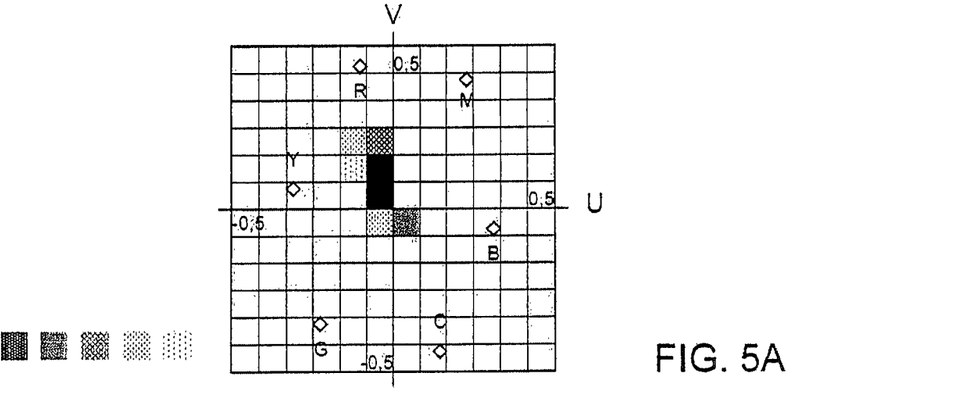
FIGS. 5A and 5B are examples of two-dimensional color histograms, which may be established within the color enhancer.
Figure 5B:
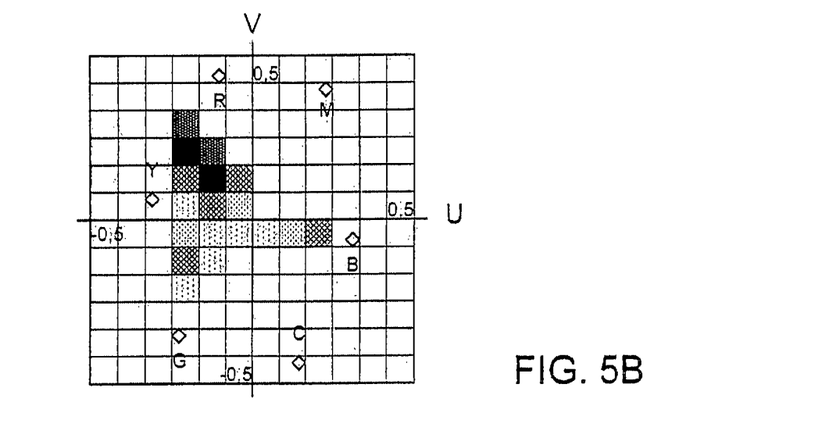

FIGS. 5A and 5B illustrate two examples of color histograms, which the histogram builder HGB may establish. Each Figure comprises a color diagram similar to the color diagram in FIGS. 3A-3C. Relatively small squares represent the segments into which the color diagram is divided. The pixel count of each segment is represented by means of a grayshade filling, which may range from white to black. A white filling represents a relatively low pixel count, which includes a zero pixel count. A black filling represents a relatively high pixel count. Accordingly, relatively dark segments indicate color ranges that are predominantly present in the one or more preceding images on which the color histograms are based.

FIG. 5A represents a color histogram for an image that comprises a typical human face with some background. The color histogram reveals that skin tone colors are predominantly present within this image. FIG. 5B represents a color histogram for an image that comprises a human face with much make up so to achieve a clown effect. The color histogram reveals that this image comprises a relatively wide range of vivid colors.

The histogram analyzer ANL establishes the color enhancement definition ED and the weighting profile WP, which are applied to the color shift operator CSO, by analyzing the color histogram HI that histogram builder HGB provides. For example, let it be assumed that the color histogram HI is similar to the color histogram illustrated in FIG. 5A, which reveals a predominance of skin tones. In that case, the histogram analyzer ANL may establish that a skin tone shift is appropriate. Accordingly, the color enhancement definition ED may define a skin tone shift with the color zone illustrated in FIG. 3A. As another example, the color histogram HI may reveal that green colors are predominantly present in one or more preceding images. In that case, the histogram analyzer ANL may define a green enhance with the color zone illustrated in FIG. 3B. As yet another example, the color histogram HI may reveal that skin tones as well as green colors are predominantly present. In that case, the color enhancement definition ED may define that a skin tone shift as well as a green enhance should be applied to the image concerned, whereby the skin tone shift has a higher order of priority than the green enhance, or vice versa.

The histogram analyzer ANL may update the color enhancement definition ED and the weighing profile WP on an image-by-image basis. That is, the histogram analyzer ANL establishes the color enhancement definition ED and the weighing profile WP for a particular image and applies the color enhancement definition ED and the weighing profile WP for each pixel $P_{i,j}$ in the particular image concerned. The color enhancement definition ED and the weighing profile WP may be based on one or more preceding images as mentioned hereinbefore.

In case a relatively large processing delay can be accommodated for, the color enhancement definition ED and the weighing profile WP may also be based on the particular image concerned itself. In that case, the histogram builder HGB first establishes a color histogram HI for the particular image concerned, which the histogram analyzer ANL analyzes for the purpose of establishing the color enhancement definition ED and the weighing profile WP. Subsequently, colors within the particular image concerned are enhanced on the basis of this color enhancement definition ED and this weighing profile WP.

The color enhancement definition ED and the weighing profile WP may also be based on one or more following images. This allows a smooth transition in terms of color enhancement when, for example, a scene change occurs.

The histogram analyzer ANL may establish the color enhancement definition ED in the following manner. In a first step, the histogram analyzer ANL determines a center of gravity within the color histogram HI that the histogram builder HGB has established. The center of gravity may be, for example, a segment that satisfies the following criterion. There is a minimal sum of weighted distances between the segment that constitutes the center of gravity and each other segment in the color histogram HI. A weighted distance between the segment that constitutes the center of gravity and another segment corresponds with a distance between these respective segments in the color histogram HI multiplied by the pixel count of the other segment. The center of gravity may also be, for example, a particular point in the color histogram HI that satisfies a similar criterion.

In a second step, the histogram analyzer ANL determines whether the center of gravity falls within a particular predefined color zone, which will be referred to as detection zone hereinafter. The histogram analyzer ANL may be configured to consider various different detection zones, each of which is associated with a particular type of color enhancement. In case the center of gravity falls within a particular detection zone, the type of color enhancement that is associated with this detection zone should be applied.

For example, let it be assumed that the color histogram HI, which the histogram builder HGB provides, is similar to the color histogram illustrated in FIG. 5A. In that case, the center of gravity corresponds with a segment that comprises skin tone colors, or a point that can be regarded as a skin tone color. The center of gravity will fall within a detection zone that is associated with a skin tone shift. The histogram analyzer ANL will then decide that the color shift operator CSO should apply the skin tone shift and will include an instruction to that effect in the color enhancement definition ED. The color shift operator CSO may then apply the color zone illustrated in FIG. 3A for the purpose of establishing a color shift vector $SV_{i,j}$ and a weighting coefficient $W_{i,j}$.

The histogram analyzer ANL may establish the color enhancement definition ED in a different manner. For example, the histogram analyzer ANL may establish a total pixel count for each color zone associated with each respective type of color enhancement. The total pixel count for the color zone corresponds with a number of pixels of the image concerned, which have a color that falls within the color zone. In case the total pixel count for a color zone is a relatively high, the histogram analyzer ANL may include the type of color enhancement that is associated with the color zone in the color enhancement definition ED. For example, in case more than 30% of the pixels fall within the color zone Z1 illustrated in FIG. 3A, the color enhancement definition ED may define that a skin tone shift should be applied.

The weighting profile WP may be a predefined weighting profile that is associated with a type of color enhancement. Once the histogram analyzer ANL has determined that a particular type of color enhancement that should be applied, the weighting profile WP that is associated with this type of color enhancement is applied to the color shift operator CSO. That is, the weighting profile WP may be independent of the color histogram HI. Alternatively, the histogram analyzer ANL may adjust the weighting profile WP as a function of one or more other statistical parameters of the color histogram HI, such as, for example, the aforementioned center of gravity.

The histogram analyzer ANL may receive control parameters PAR that effectively define decision criteria, which the histogram analyzer ANL applies for establishing the color enhancement definition ED and the weighting profile WP on the basis of the color histogram HI. For example, the control parameters PAR may define whether a center of gravity approach as described hereinbefore should be used for establishing the color enhancement definition ED, or another approach. The control parameters PAR may further define various detection zones for various types of color enhancement. The control parameters PAR may also indicate if a fixed weighting profile should be used for given type of color enhancement, or if the weighting profile WP should depend on details of the color histogram HI. The control parameters PAR may further define one or more statistical parameters as a function of which the weighting profile WP should be adjusted, as well as the function in accordance with which the weighting profile WP should be adjusted. The histogram analyzer ANL may receive the control parameters PAR from the controller CTRL, which may establish these control parameters on the basis of, for example, user preferences.

Figure 6:
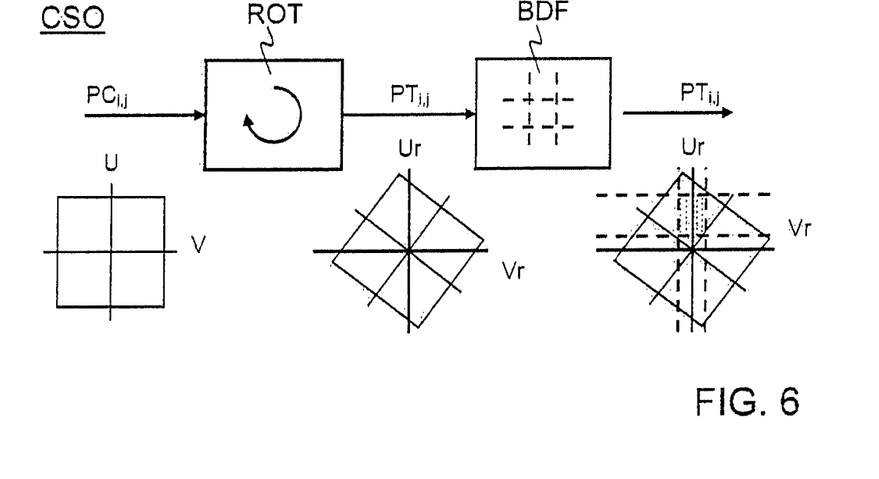
FIG. 6 is a functional diagram that illustrates a color shift operator, which forms part of the color enhancer.

FIG. 6 illustrates an implementation of the color shift operator CSO, which forms part of the enhancement vector generator EVG illustrated in FIG. 2. This implementation comprises the following functional entities: a rotator ROT and a border definer BDF. The rotator ROT effectively rotates the YUV color space along the luminance axis. Accordingly, a rotated YUV color space is obtained, which will be referred to as YUrVr color space hereinafter. The YUrVr color space has a first chrominance axis Ur and a second chrominance axis Vr, which are rotated versions of the first chrominance axis and the second chrominance axis in the YUV color space, as illustrated in FIG. 6. The rotator ROT provides a rotated converted pixel in the YUrVr color space, which corresponds with the converted pixel $PC_{i,j}$ in the YUV color space.

The border definer BDF effectively defines borders within the YUrVr color space. These borders may be parallel to the first chrominance axis Ur or the second chrominance axis Vr. These borders may also have a particular angle with respect to one of these chrominance axes. The borders define a color zone within the YUrVr color space that is used for the purpose of a particular type of color enhancement as explained hereinbefore. For example, the border definer BDF may define the color zone illustrated in FIG. 3A, which is applied for a skin tone shift.

The color zone Z1 illustrated in FIG. 3A has a trapezium shape. That is, the color zone Z1 is relatively narrow close to the origin of the color diagram, where colors are saturated to a relatively small degree. Conversely, the color zone Z1 is relatively wide far away from the origin, where colors are saturated to a relatively large degree. The trapezium shape allows a relatively homogeneous color shift. This can be understood by the following consideration. Close to the origin, a relatively small displacement along the U axis or the V axis, or both axes, corresponds with a relatively large color change. In order to obtain a similar color change relatively far away from the origin, a larger displacement is required. That is, the further away a point is located from the origin, the greater the displacement that is required in terms of U and V coordinates in order to obtain a particular degree of color change. The trapezium shape of the color zone Z1 in FIG. 3A accounts for this, which allows a relatively homogeneous color shift.

It should be noted that any of the functional entities illustrated in FIG. 2 may be implemented by means of software or hardware, or a combination of software and hardware. For example, each of these functional entities may be implemented by suitably programming a processor. In such a software-based implementation, a software module may cause the processor to carry out specific operations that belong to a particular functional entity. As another example, each of the aforementioned functional entities may be implemented in the form of a dedicated circuit. This is a hardware-based implementation. Hybrid implementations may involve software modules as well as one or more dedicated circuits.

Figure 7:
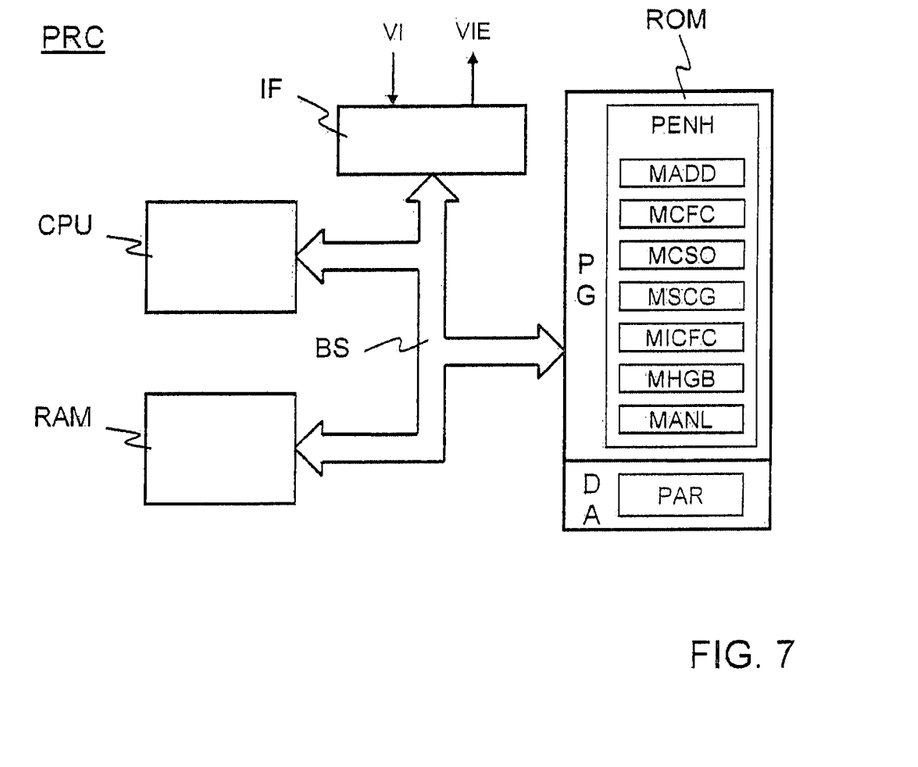
FIG. 7 is a block diagram that illustrates a processor that constitutes a software-based implementation of the color enhancer.

FIG. 7 illustrates a processor PRC that is a software-based implementation of the color enhancer ENH illustrated in FIG. 2. The processor PRC comprises an interface IF, an instruction-executing circuit CPU, a volatile memory RAM, and a nonvolatile memory ROM. A bus BS couples the aforementioned elements to each other. The processor PRC receives the internal video signal VI via the interface IF and provides the enhanced internal video signal VIE via the interface IF. To that end, the interface IF may comprise one or more data buffers. The nonvolatile memory ROM has a program section PG that comprises a color enhancement software program PENH.

The color enhancement software program PENH comprises a set of instructions, which causes the instruction-executing circuit CPU to carry out various operations that have been described with reference to the color enhancer ENH illustrated in FIG. 2. The color enhancement software program PENH may comprise various modules MADD, MCFC, MCSO, MSCG, MICFC, MHGB, MANL, each of which implements a particular functional entity illustrated in FIG. 2. The nonvolatile memory ROM has a data section DA that comprises the control parameters PAR for the histogram analyzer ANL, as well control parameters PAR as for other functional entities. The nonvolatile memory RAM may comprise the image memory MEM illustrated in FIG. 2. The delay DEL may be implemented by temporarily storing pixel $P_{i,j}$ in the nonvolatile memory RAM.

The processor PRC illustrated in FIG. 2 may be, for example, a personal computer, a personal communication device, or any other type of apparatus that has data processing capabilities. The nonvolatile memory ROM may be in form of, for example, a hard disk, an electrically erasable programmable read-only memory, or any other type of medium that is capable of storing data. The color enhancement software program PENH may be written into the nonvolatile memory ROM by downloading this program from a server via a communication network, which may comprise the Internet. Such a download may be subject to a payment. In an alternative, the color enhancement software program PENH and the training software program may also be downloaded into the volatile memory RAM when a video enhancement function is required at a particular instant. The color enhancement software program PENH needs to be downloaded anew when the apparatus has been switched off.

Concluding Remarks

The detailed description hereinbefore with reference to the drawings is merely an illustration of the invention and the additional features, which are defined in the claims. The invention can be implemented in numerous different manners. In order to illustrate this, some alternatives are briefly indicated.

The invention may be applied to advantage in any type of product or method that relates to processing color images. The video system VSY illustrated in FIG. 1 is merely an example. The invention may equally be applied to advantage in, for example, a communication apparatus that is capable of receiving image via a network, such as, for example, the Internet. The communication apparatus may be in the form of, for example, a personal computer, a set-top box, a cellular phone, or a personal digital assistant.

There are numerous different manners to implement a color shift vector generator in accordance with the invention. FIG. 2 illustrates an implementation in which the color shift operator CSO and the color shift vector composer SCV constitute the color shift vector generator. In another implementation, a single functional entity may form the color shift vector generator. This single functional entity may establish a color shift vector in a direct fashion, rather than in an indirect fashion that involves establishing a gross color shift vector, as described with reference to FIG. 2.

In the implementation illustrated in FIG. 2, the color shift vector generator can provide several types of color enhancement in dependence on the color enhancement definition ED. In another implementation, which is simpler, the color shift vector generator may provide only a single type of color enhancement, such as, for example, a skin tone shift. In the implementation illustrated in FIG. 2, a decision is made regarding the type of color enhancement that is to be applied, by means of a histogram-based color analysis of one or more images. In another implementation, such a decision can be made using an analysis technique that does not necessarily involve building a histogram. For example, an image may be divided into several segments whereby an average color is determined for each segment. It should further be noted that in the implementation illustrated in FIG. 2, the histogram-based color analysis can be modified by means of control parameters PAR. In another implementation, an image analysis may be fixed for the sake of simplicity.

The term "image" should be understood in a broad sense. This term includes a frame, a field, and any other entity that may wholly or partially constitute an image or a picture.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software or both carry out a function.

The remarks made herein before demonstrate that the detailed description with reference to the drawings, illustrate rather than limit the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

The invention claimed is:

1. An image processor comprising:
   an instruction-executing unit;
   a color format converter for converting, under control of the instruction-executing unit, a pixel, which is expressed in an RGB color space, into a converted pixel, which is expressed in a YUV color space;
   a color shift vector generator for generating, under control of the instruction-executing unit, a color shift vector, which is expressed in the YUV color space, on the basis of the converted pixel, the color shift vector generator being arranged to generate the color shift vector on the basis of a color enhancement definition, which comprises a definition of at least one type of color enhancement, wherein respective color zones in the YUV color space are associated with respective types of color enhancement, the color shift vector generator being arranged to detect if the converted pixel falls within a color zone and, if so, to generate the color shift vector in accordance with the type of color enhancement associated with that color zone, and wherein the color enhancement definition defines an order of priority for different types of color enhancement, the color shift vector generator being arranged to apply the type of color enhancement that has the highest priority among those respective types of color enhancement that are associated with respective color zones in which the converted pixel falls;
   an inverse color format converter for converting, under control of the instruction-executing unit, the color shift vector into a color enhancement vector, which is expressed in the RGB color space; and
   an adder for adding , under control of the instruction-executing unit, the color enhancement vector to the pixel so as to obtain a color enhanced pixel.

2. An image processor as claimed in claim 1, wherein the color shift vector generator is arranged to generate the color shift vector on the basis of a color zone that has a trapezium shape.

3. An image processor as claimed in claim 1, comprising:
   an image analyzer for analyzing, under control of the instruction-executing unit, at least one image that the image processor receives so as to establish the color enhancement definition depending on colors that are predominant in the at least one image.

4. An image processor as claimed in claim 3, comprising:
   a histogram builder for establishing, under control of the instruction-executing unit, a color histogram on the basis of the at least one image, the color histogram indicating colors that are predominant in the at least one image; and
   a histogram analyzer for establishing, under control of the instruction-executing unit, the color enhancement definition on the basis of the color histogram.

5. An image processor as claimed in claim 3, comprising:
   a controller for applying, under control of the instruction-executing unit, control parameters to the image analyzer on the basis of which the image analyzer establishes the color enhancement definition as a function of the colors that are predominant in the at least one image.

6. An image processor as claimed in claim 1, the color shift vector generator comprising:
   a color shift operator for providing, under control of the instruction-executing unit, a gross color shift vector and a weighting coefficient for a converted pixel that falls within a color zone in the YUV color space, the weighting coefficient depending on a relative position of the converted pixel within the color zone in accordance with a weighting profile; and
   a color shift vector composer for composing, under control of the instruction-executing unit, the color shift vector on the basis of the gross color shift vector and the weighting coefficient.

7. An image processor as claimed in claim 6, comprising:
   an image analyzer for analyzing, under control of the instruction-executing unit, at least one image that the image processor receives so as to establish the color enhancement definition and the weighting profile depending on colors that are predominant in the at least one image.

8. A method of color enhancement comprising:
   converting a pixel, which is expressed in an RGB color space, into a converted pixel, which is expressed in an YUV color space;
   generating a color shift vector on the basis of the converted pixel and on the basis of a color enhancement definition, which comprises a definition of at least one type of color enhancement, wherein respective color zones in the YUV color space are associated with respective types of color enhancement and wherein each type of color enhancement is assigned a priority order, the color shift vector being expressed in the YUV color space, wherein if the converted pixel falls within more than one color zone, applying the type of color enhancement that has a highest priority among those respective types of color enhancement that are associated with respective color zones in which the converted pixel falls;
   converting the color shift vector into a color enhancement vector, which is expressed in the RGB color space; and
   adding the color enhancement vector to the pixel so as to obtain a color enhanced pixel.

9. A video system comprising an image processor according to claim 1 and a display device for displaying a color enhanced image that comprises color enhanced pixels, which the image processor provides.

10. A computer program product for a programmable processor, the computer program product comprising a set of instructions recorded in computer readable storage media that, when loaded into the programmable processor, causes the programmable processor to carry out the method according to claim 8.

* * * * *